PIEZOELECTRIC CERAMIC RESONATOR WITH ASYMMETRICALLY ROUGH EDGE

Filed June 3, 1971 2 Sheets-Sheet 1

INVENTORS
TAKASHI NAGATA
YASUO NAKAJIMA

BY Wenderoth, Lind & Ponack
ATTORNEYS

Feb. 20, 1973 TAKASHI NAGATA ET AL 3,717,778

PIEZOELECTRIC CERAMIC RESONATOR WITH ASYMMETRICALLY ROUGH EDGE

Filed June 3, 1971 2 Sheets-Sheet 2

INVENTORS
TAKASHI NAGATA
YASUO NAKAJIMA

BY Wenderoth, Lind & Ponack
ATTORNEYS

United States Patent Office 3,717,778
Patented Feb. 20, 1973

3,717,778
PIEZOELECTRIC CERAMIC RESONATOR WITH ASYMMETRICALLY ROUGH EDGE

Takashi Nagata, Ikeda, and Yasuo Nakajima, Osaka, Japan, assignors to Matsushita Electric Industrial Co., Ltd., Kadoma, Osaka, Japan Filed June 3, 1971, Ser. No. 149,529
Claims priority, application Japan, June 5, 1970, 45/49,011
Int. Cl. H01v 7/00, 7/02
U.S. Cl. 310—9.5 7 Claims

ABSTRACT OF THE DISCLOSURE

A piezoelectric ceramic resonator which is free from spurious vibrations when operating in a high frequency range. The resonator is composed of a thin piezoelectric ceramic plate having an electromechanical coupling factor for the thickness-extensional mode vibration at least four times higher than the mechanical coupling factor for the contour mode. The thin ceramic plate has a thickness for causing it to vibrate at a preselected frequency in the thickness-extensional vibration mode at a frequency range higher than twenty megacycles and has an asymmetrically rough peripheral edge having a roughness on the order of one quarter wavelength of the preselected frequency for eliminating unwanted vibrations. Electrodes are provided on said ceramic plate for causing said vibration when an alternating current is supplied thereto.

BACKGROUND OF THE INVENTION

Field of the invention

This invention relates to an improved ceramic resonator. In particular, it relates to a piezoelectric ceramic resonator operating at a high frequency, i.e. a frequency above twenty megacycles, and being free from spurious responses.

Description of the prior art

The ceramic resonators of the type to which the present invention pertains are those which are vibrated in the thickness-extensional mode at a selected frequency. A resonance frequency of the thickness-extensional mode resonator is inversely proportional to the thickness of the resonator. Accordingly the thickness-extensional mode of the resonator is frequency used for vibration at a high frequency above one megacycle.

A difficulty in connection with the use of a thickness-extensional mode resonator is the existence of many unwanted vibration responses existing near the vibration frequencies in the thickness-extensional mode vibration thereof. Great efforts have been made to eliminate those spurious responses. One typical method is the acoustic damping as disclosed in British Pat. No. 414,764 accepted in Nov. 29, 1934 and U.S. Pat. No. 3,321,648 patented May 23, 1967. Control of the factors governing the shape of the resonator, such as the diameter to thickness ratio, is also effective to eliminate the spurious responses as disclosed in U.S. Pat. No. 3,348,078 patented Oct. 17, 1967. The other method is control of the electrode deposition, such as the electrode region and thickness, as disclosed in U.S. Pat. No. 3,222,622 patented Dec. 7, 1967 and U.S. Pat. No. 3,020,424 patented Feb. 6, 1962.

In spite of these many efforts, difficulty has still been encountered in operating a ceramic resonator at a frequency above twenty megacycles. One of the reasons is that each piezoelectric ceramic material has different spurious responses at such a high frequency, and the general methods for eliminating the spurious responses cannot be used. The other is that skillful techniques for eliminating the spurious responses, especially for a ceramic resonator having a large electromechanical coupling factor, have not been developed for such a high frequency range.

In addition, in a piezoelectric ceramic resonator vibrating in the thickness-extensional mode further difficuties occur, because the ceramic resonator essentially has vibration responses of the thickness-extensional vibrations as well as vibration responses of the contour vibrations and their overtones. Those contour vibrations and their overtones cause unwanted vibration responses as compared to the vibration responses of the thickness-extensional vibrations.

SUMMARY OF THE INVENTION

It is, therefore, a primary object of the invention to provide a thickness-extensional mode ceramic resonator which is free from any unwanted vibration responses near the vibration frequencies in the thickness-extensional mode vibration at a frequency above 20 megacycles.

These objectives are achieved by providing a piezoelectric ceramic resonator composed of a thin piezoelectric ceramic plate having electrodes thereon and having an electromechanical coupling factor for the thickness mode at least four times higher than that for the contour mode. The thin ceramic plate has a thickness such that it will vibrate at a pre-selected frequency selected from one the harmonics of a thickness-extensional mode vibration in a frequency range higher than twenty megacycles. Spurious responses are eliminated by an asymmetric peripheral edge on the thin ceramic plate.

BRIEF DESCRIPTION OF THE DRAWINGS

Other features and advantages will become apparent from the following description taken in connection with the drawings, wherein.

DESCRIPTION OF THE PREFERRED EMBODIMENT

The present invention is directed to the control of spurious vibration by control of the resonator shape, the vibration mode and the piezoelectric ceramic material.

Figure 1:
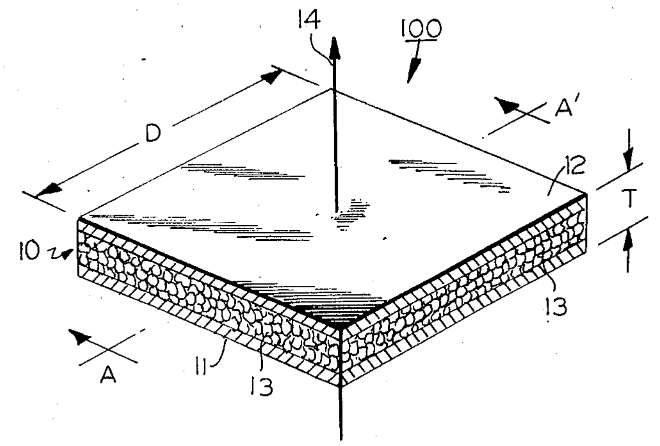
FIG. 1 is a perspective view showing a ceramic resonator according to the present invention.

Referring to FIG. 1, the ceramic resonator 100 comprises a thin ceramic plate 10 having electrodes 11 and 12 on major flat surfaces thereon. The ceramic plate 10 is polarized in a direction perpendicular to the flat major surfaces, as is shown by the arrow 14. A preferred material for the ceramic plate is a piezoelectric ceramic material having an electromechanical coupling factor $k_t$ in the thickness-extensional mode greater than four times the coupling factor $k_p$ in the contour mode. Such piezoelectric ceramics are solid solutions of lead titanate and their modifiers combined with certain additives. It is particularly advantageous that the ceramic plate 10 be comprised of a solid solution of 96.5 mol percent $PbTiO_3$+1 mol percent $MnO_2$+2.5 mol percent $LaO_{3/2}$. For this piezoelectric ceramic material the coupling factor $k_t$ is 46%, while the coupling factor $k_p$ is less than 7%.

The limitation that $k_t$ be four times larger than $k_p$ is one of the important conditions of the present invention. If $k_p$ becomes larger than ¼ $k_t$, it is difficult to eliminate the spurious responses because the series of contour-vibrations are strongly excited by the piezoelectric effect of $k_p$ and the spurious responses of those vibrations cannot be eliminated by the method described hereinbelow.

The electrodes 11 and 12 are deposited on respective major faces of the ceramic plate, for example by electroless-plating. A peripheral edge 13 of the ceramic plate has an asymmetric rough surface. The roughness of the rough surface is required to be approximately twenty microns and the degree of roughness relates to the quarter wave length of the desired vibration.

Figure 2:
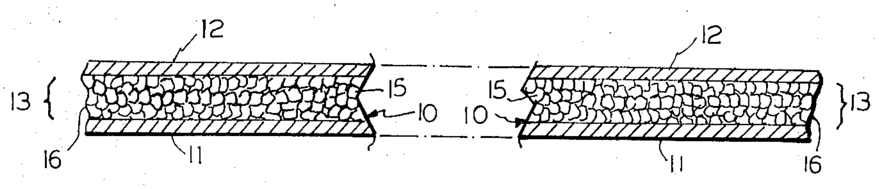
FIG. 2 is a sectional view taken on line A—A; of FIG. 1.

In FIG. 2 is shown a greatly enlarged sectional view along a line A–A' of FIG. 1 for explaining the shape of the peripheral edge. In FIG. 2 each segment 15 shows grain boundaries of the ceramic plate having a polycrystalline structure and the rough edge 13 has an uneven surface 16 in a direction of the thickness of the plate 10. The surface 16 is made even more uneven by the presence of microscopic irregularities along the grain boundaries.

If each rough dimension of the uneven surface is on the order of the quarter wave length of the desired vibration, the unwanted vibrations are caused to dissipate and scatter innumerably so that the effect of the unwanted vibrations can be made practically negligible. Contour dimension D of FIG. 1 is also important for making the sum of the dissipated and scattered vibrations negligible. According to the invention, the ratio of the countour dimension D to the thickness T of the resonator has to be larger than seven. If the ratio is less than seven, it is not possible to make the sum of those dissipated and scattered vibrations negligible because the dissipations and the scattering when the condition $D/T<7$ exists are not enough to cause those unwanted vibrations to cancel each other.

Figure 4:
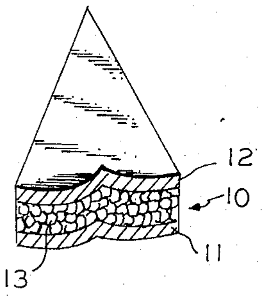
FIGS. 3 and 4 are modified forms of the ceramic resonator shown in FIG. 1.
Figure 3:
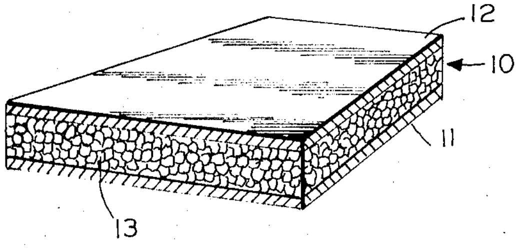

Particular variations of the ceramic resonator shown in FIG. 1 are shown in FIGS. 3 and 4. In FIGS. 3 and 4 the contour of the ceramic plate 10 is that of an asymmetric polygon. The peripheral edge 13 of the polygons is required to have the uneven surface, as is described hereinabove. The asymmetric polygon contour shape is truly effective to cause random dissipations and scattering of the unwanted vibrations for the same reason discussed hereinbefore. In FIG. 3 and FIG. 4, the contour dimension D is defined as a length of the longest side of the asymmetric polygon, because the vibration response of the lowest vibration mode of the contour vibration will be inversely proportional to this length.

The mode of vibration is also an important condition of the resonators according to the present invention. As the mode of vibration, one of the harmonics of the fundamental resonant thickness-extensional vibration should be selected. By the harmonics of the fundamental resonant thickness-extensional vibration are meant the harmonies such as the third, fifth, etc. of the fundamental resonant vibration of the thickness-extensional mode. The unwanted vibrations coupling to the desired harmonic increase and the performances of their vibration responses decrease as the number of the harmonic becomes higher, such as third, fifth, etc. This is due to the fact that the piezoelectric coupling effect of those unwanted vibrations tends to be straight-forwardly weakened as the number of the desired harmonic increases.

The ceramic resonator of the invention as described hereinabove can be fabricated in the following way. The polarized lead titanate ceramic is lapped and/or sliced into the thin plate, the thickness of which is determined by the desired frequency of vibration. For a 110 mHz., which is the third harmonic of the resonant thickness-extensional-mode vibration, the required thickness is 70 microns. The electrodes are deposited on the respective surfaces thereon by electroless plating. The electroded thin plate is then formed into the contour shape, as is described in connection with FIGS. 2, 3 and 4. The asymmetric rough edge is preferably shaped by the scribing and breaking of the thin plate. The aforesaid lead titanate ceramic has grain sizes from one to five microns. When the thin ceramic plate is formed into the contour shape by the scribing and the breaking, the peripheral edge has an uneven surface with irregularities with a size of from one to twenty microns, since the ceramic plate tends to break at random along the grain boundaries of the ceramic material. The method of the scribing and the breaking is very effective to get the asymmetric peripheral edge with irregularities of a size from one to twenty microns.

Another preferred method of machining for achieving the contour shape of the ceramic resonator is ultrasonic machining. With the ultrasonic machining, the roughness of the peripheral edge depends largely on the particle sizes of the abrasive powders used for the ultrasonic machining. A preferred average size of the abrasive powder is from twenty-four microns to sixty-seven microns, and corresponding mesh numbers are No. 700 to No. 240, respectively. The ultrasonic machining of the contour shape is especially useful for making an asymmetric polygon while keeping the rough edge.

Figure 5:
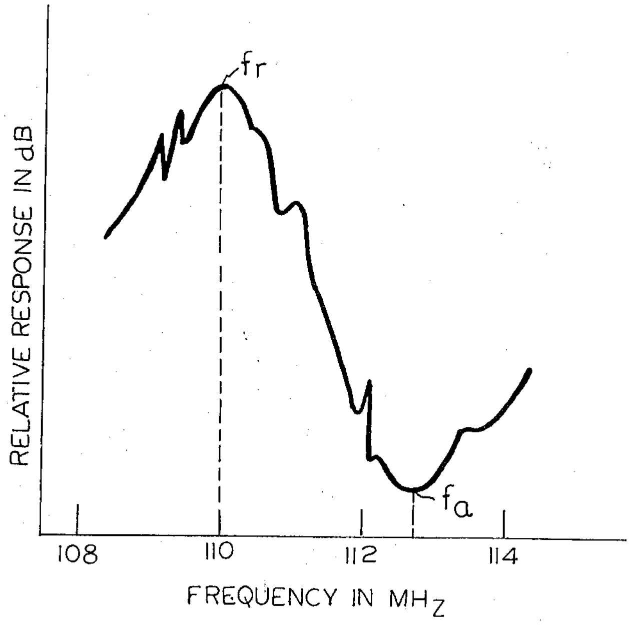
FIG. 5 is a graphical representation of the performance of a ceramic resonator made according to the best known techniques before the present invention.
Figure 6:
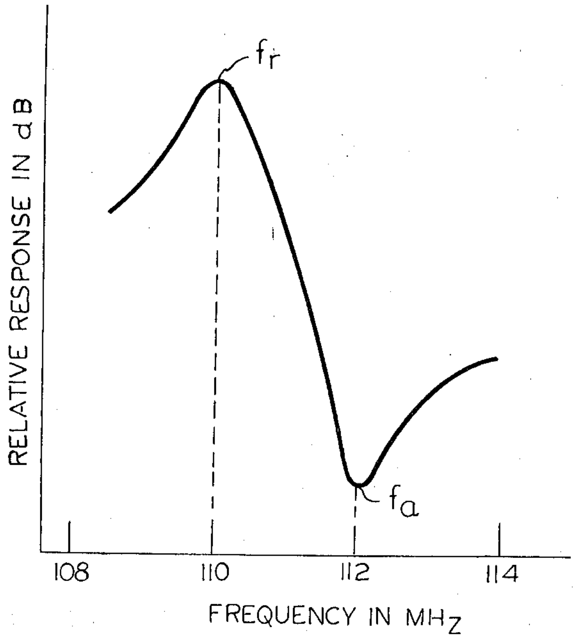
FIG. 6 is a graphical representation of the performance of ceramic resonator made according to the invention.

Referring to FIGS. 5 and 6, the performances of the lead titanate ceramic resonators operating at a very high frequency, such as 110 megacycles, are shown. The ceramic resonator, the operating characteristics of which are shown in FIG. 5, was made by the conventional method, as is disclosed in the prior art, and the ceramic resonator, the operating characteristics of which are shown in FIG. 6, was made according to the present invention. In both figures, $f_r$ and $f_a$ show the resonance and anti-resonance frequency of the desired vibration, respectively. The curve of FIG. 5 shows many ripples due to the unwanted vibrations near those frequencies. On the other hand, the curve of FIG. 6 shows a great improvement in eliminating those unwanted responses.

From the description and the drawings of the embodiments chosen as exemplary of the principles of both the method and article aspects of the present invention, it will be clear to those skilled in the art that certain minor modifications and variations may be employed without departing from the essence and true spirit of the invention. Accordingly, it is to be understood that the invention should be deemed limited only by the fair scope of the claims that follow and equivalents thereto.

What is claimed is:

1. A piezoelectric ceramic resonator composed of a thin piezoelectric ceramic plate which is polarized in the thickness direction and having an electromechanical coupling factor for the thickness-extensional mode at least four times that of the contour mode, said thin ceramic plate having a thickness for causing it to vibrate at one of harmonics of the thickness-extensional vibrations at a pre-selected frequency in a frequency range higher than twenty megacycles, and said plate having a peripheral edge which has an asymmetrically rough surface having a roughness on the order of a quarter wave length of the desired frequency of vibration, and electrodes on said ceramic plate for causing said vibration when an alternating current is supplied to the electrodes.

2. A piezoelectric ceramic resonator as claimed in claim 1 wherein said rough surface of said edge is formed by the steps of scribing the plate and then breaking it along the scribe marks.

3. A piezoelectric ceramic resonator as claimed in claim 1 wherein said rough surface of said edge is formed by the step of ultrasonically machining the plate using an abrasive powder having an average particle size from twenty-four to sixty-seven microns.

4. A piezoelectric ceramic resonator as claimed in claim 1 wherein said rough surface edge has an uneven surface with irregularities with a size of from one to twenty microns.

5. A piezoelectric ceramic resonator as claimed in claim 1 wherein the ratio of the contour dimension to the thickness of said ceramic plate is larger than seven.

6. A piezoelectric ceramic resonator as claimed in claim 1 wherein said piezoelectric ceramic of said plate is a solid solution of $PbTiO_3$ as the principal element.

7. A piezoelectric ceramic resonator as claimed in claim 6 wherein said piezoelectric ceramic of said plate is a solid solution of 96.5 mol percent of $PbTiO_3$, 2.5 mol percent of $LaO_{3/2}$ and 1.0 mol percent of $MnO_2$.

References Cited

UNITED STATES PATENTS

| | | | |
|---|---|---|---|
| 3,348,078 | 10/1967 | Nagata et al. | 310—8.2 X |
| 3,020,424 | 2/1962 | Bechmann | 310—9.5 |
| 2,485,722 | 10/1949 | Erwin | 310—9.5 X |
| 3,074,034 | 1/1963 | Crownover | 310—9.6 X |
| 2,799,789 | 7/1957 | Wolfskill | 310—9.0 |
| 2,245,178 | 6/1941 | Bechmann | 310—9.6 X |
| 2,159,891 | 5/1939 | Guerbilsky | 310—8.2 |

J D MILLER, Primary Examiner

M. O. BUDD, Assistant Examiner

U.S. Cl. X.R.

310—8.2, 9.6